United States Patent [19]

Sayyah et al.

[11] Patent Number: 5,245,455
[45] Date of Patent: Sep. 14, 1993

[54] MOS LIGHT VALVE WITH NEMATIC LIQUID CRYSTAL OPERATING IN THE SURFACE MODE

[75] Inventors: Keyvan Sayyah; Chiung-Sheng Wu, both of Los Angeles, Calif.

[73] Assignee: Hughes Aircraft Company, Los Angeles, Calif.

[21] Appl. No.: 580,394

[22] Filed: Sep. 10, 1990

[51] Int. Cl.$^5$ .......................................... G02F 1/135
[52] U.S. Cl. ...................................... 359/72; 359/74; 359/82; 359/93; 359/71
[58] Field of Search .......... 350/347 E, 347 R, 331 R, 350/342, 332; 359/72, 74, 71, 79, 84, 93, 102, 82

[56] References Cited

U.S. PATENT DOCUMENTS

| | | | |
|---|---|---|---|
| 4,126,382 | 11/1978 | Barzilai et al. | 359/55 |
| 4,191,454 | 3/1980 | Braatz et al. | 359/72 |
| 4,239,348 | 12/1980 | Grinberg et al. | 350/342 |
| 4,443,064 | 4/1984 | Grinberg et al. | 350/342 |
| 4,582,396 | 4/1986 | Bos et al. | 350/347 E |
| 4,595,259 | 6/1986 | Perregaux | 350/331 R |
| 4,779,959 | 10/1988 | Saunders | 359/77 |

FOREIGN PATENT DOCUMENTS 2227853 8/1990 United Kingdom .

OTHER PUBLICATIONS

J. Fergason—"Performance of a Matrix Display Using Surface Mode" Conference Record, Biennial Display Research—1980—pp. 177-179.

K. Uehara et al., "Reduction of Electro-Optical Response Times of a Field-Effect LCD: Application to Dynamic Driven Real Time Display" IEEE Transactions on Electrons Devices, vol. ED-22-No. 9-Sep. 1975-pp. 804-805.

P. R. Ashley et al., "Amorphous Silicon Photoconductor in a Liquid Crystal Spatial Light Modulator", Applied Optics, vol. 26, No. 2, Jan. 15, 1987 pp. 241-246.

"High-speed liquid-crystal modulators using transient nematic effect", S. Wu et al, J. Appl. Phys. 65(2), Jan. 15, 1989, pp. 527-532.

"The silicon liquid-crystal light valve", U. Efron et al, J. Appl. Phys. 57(4), Feb. 15, 1985, pp. 1356-1368.

"High performance single crystal silicon liquid crystal light valve with good image uniformity", K. Sayyah, et al., Applied Optics, vol. 28, No. 22, Nov. 15, 1989 pp. 4748-4756.

"Small angle relaxation of highly deformed nematic liquid crystals", S. Wu, et al Appl. Phys. Lett. 53(19), Nov. 7, 1988, pp. 1794-1796.

"Near-infrared-to-visible image conversion using a Si liquid-crystal light valve", S. Wu, et al., Optics Letters, vol. 13, No. 1, Jan. 1988, pp. 13-15.

"Design of a liquid crystal based tunable electrooptic filter", S. Wu, Applied Optics, vol. 28, No. 1, Jan. 1, 1989, pp. 48-52.

Primary Examiner—William L. Sikes
Assistant Examiner—Tai V. Duong
Attorney, Agent, or Firm—V. D. Duraiswamy; W. K. Denson-Low

[57] ABSTRACT

A light valve (10) includes a layer of a liquid crystal (16), a MOS substrate structure (18) with a dielectric layer (24) and a semiconductor layer (26), and an optically isolating mirror (14) between the liquid crystal layer (16) and the substrate structure (18). An external AC biasing voltage is applied across the MOS substrate (18) and the liquid crystal layer (16). The liquid crystal layer (16) is sufficiently thick that it operates in the surface birefringent mode with a high contrast ratio and a short response time to changes in the write-in light beam, when a sufficiently high biasing voltage $V_p$ is applied.

17 Claims, 2 Drawing Sheets

MOS LIGHT VALVE WITH NEMATIC LIQUID CRYSTAL OPERATING IN THE SURFACE MODE

BACKGROUND OF THE INVENTION

This invention relates to liquid crystal light valves, and, more particularly, to such a light valve having a fast response time and good spatial resolution.

A liquid crystal light valve is a device in which one beam of light is used to modulate the intensity and/or phase of another beam of light. The information contained in a "write-in" or input light beam is transformed into the corresponding information in a projection or output light beam. One application of the liquid crystal light valve is as an image amplifier or a light projector, wherein the write-in light beam has a weak intensity and the projection light beam has a strong intensity, with the information in the weak beam transformed into the corresponding information in the strong beam. Another application is a wavelength converter, where the write-in beam has one wavelength and the projection beam another wavelength. In yet another application, the write-in beam is ordinary incoherent light, and the projection beam is a coherent light beam produced by a laser, so that the information in the incoherent light beam is transformed into a coherent form of the same information (or the device may operate in the reverse fashion, with information in a coherent beam transformed to information in an incoherent beam).

Various types of liquid crystal light valves have been developed, including reflective and transmissive types. In a reflective liquid crystal light valve, a projection beam is directed against a mirror from an exterior light source. A thin layer, typically about 2-4 micrometers thick, of liquid crystal material is on the projection-beam side of the mirror. The projection beam passes through the liquid crystal layer twice, once before it reaches the mirror and again after it is reflected from the mirror. The projected beam is modulated by locally varying the transmission or phase relation of the liquid crystal according to the intensity of the write-in beam. For example, if at a particular location the write-in beam is of low light intensity, the liquid crystal is caused to have low transmittance so that not much of the projection beam is reflected. The liquid crystal can be made to operate in a generally proportional manner, so that the gradations in intensity of the write-in beam are transformed into corresponding gradations in intensity and phase of the projection beam.

The liquid crystal material is generally formed of elongated molecules that can be made to align in various directions under the influence of physical constraints and an applied electric field. The direction in which the molecules point, termed the director, determines the optical response of the liquid crystal to the light beam. In a typical liquid crystal light valve, the directors of the liquid crystal layer are initially oriented by the fabrication techniques to lie parallel to the surface of the mirror. The application of an electric field causes the directors to rotate toward an orientation perpendicular to the mirror.

In the liquid crystal light valve, the liquid crystal layer is on one side of the mirror. On the other side is a substrate structure that modulates an electric field applied to the liquid crystal responsive to the local intensity of the write-in beam. A number of different types of such light valve substrates have been devised, and one such structure, a MOS (metal-oxide-semiconductor) photosubstrate, is of particular significance to the present invention. The MOS photosubstrate structure, which has been known for over 10 years, includes a layer of dielectric material, typically silicon dioxide, adjacent the mirror, and a layer of high-resistivity semiconductor, typically silicon, contacting the dielectric material. An AC (alternating current) biasing voltage is applied across the liquid crystal layer/mirror/MOS photosubstrate. This voltage, in conjunction with the electrical current induced in the silicon by the incident write-in beam, produces the voltage variations that activate the liquid crystal to control the projection beam.

Some key operating parameters of a liquid crystal light valve are its spatial resolution, output modulation or contrast ratio (dynamic range), gray scale capability, wavefront distortion, and response time to changes in the write-in beam. Because of the physical characteristics of the liquid crystal layer, in existing MOS photosubstrate liquid crystal light valves there is a tradeoff between these parameters: to achieve a faster response time with a thin liquid crystal layer, the contrast ratio (dynamic range) is compromised.

Therefore, there is a need for an improved MOS photosubstrate liquid crystal light valve in which fast response time is achieved without sacrificing contrast ratio, and while achieving good spatial resolution and gray scale capability. The present invention fulfills this need, and further provides related advantages.

SUMMARY OF THE INVENTION

The present invention provides a MOS photosubstrate liquid crystal light valve that achieves response times on the order of 1 millisecond while maintaining high spatial resolution, contrast ratio, and gray scale capability. The structure of the device is similar to existing light valves in some respects, and in particular in the MOS structure itself, so that proven manufacturing techniques can be used in this difficult-to-fabricate portion of the device. Other portions of the structure are modified to achieve the improved performance characteristics. The approach of the invention is compatible with most other modifications that improve light valve performance.

In accordance with the invention, a liquid crystal light valve comprises an active structure having a layer of a nematic liquid crystal that is operable in a surface birefringent mode of operation, mirror means adjacent the liquid crystal layer for reflecting incident light directed against the mirror means through the liquid crystal, and a light valve substrate structure which is reactive to a write-in light beam, the substrate structure including a dielectric layer adjacent the mirror means and a semiconductor body adjacent the dielectric layer; and means for applying an electric bias potential varying between a positive and a negative value across the active structure, the RMS (root mean square) potential producing a minimum in the transmittance of the liquid crystal to polarized light that is analyzed with a crossed analyzer, when there is no write-in light beam, the combination of thickness of the liquid crystal and the applied bias potential being such that the transmission as a function of time of the liquid crystal upon discontinuance of the write-in light beam exhibits an undershoot prior to approaching a steady state. (As used herein, an "undershoot" includes both a decrease below the steady state value and a return to that value, and also a decrease below the steady state value, increase to slightly above the steady state value, and return to the steady state value.)

The MOS liquid crystal light valve device of the invention utilizes a layer of liquid crystal, a MOS light valve substrate, and an intermediate mirror for optically isolating the MOS substrate from the liquid crystal. A carefully defined AC (alternating current) electrical bias signal is applied across this active structure.

The liquid crystal layer is operated in the surface birefringent mode. In this operating mode, the light transmission behavior of the liquid crystal layer is established by the movement of liquid crystal directors near the surfaces of the layer, and those directors in the center of the liquid crystal layer have little effect upon the active operation of the device. In the most practical form of a device of the invention that achieves a good dynamic response range, good spatial resolution, and good gray scale performance as well as a fast response time, such a mode of operation is achieved by making the liquid crystal layer thicker than the liquid crystal layers of conventional liquid crystal light valves. The optical response time of the thicker liquid crystal layers operating in the surface birefringent mode is insensitive to liquid crystal thickness rather than inversely dependent upon the square of the thickness as for thinner layers.

The thickness of the liquid crystal layer in conventional MOS light valves is about 2-4 micrometers. The thickness of the liquid crystal layer in the preferred MOS light valve devices of the present invention is greater, preferably no less than about 8 micrometers, and most preferably about 8-12 micrometers, in thickness.

The use of a thick liquid crystal layer permits the use of a high bias voltage for minimum transmission of the readout beam through the liquid crystal layer. The bias voltage is selected to bias the liquid crystal to the voltage resulting in an undershoot in the intensity-time curve when the write-in signal is suddenly reduced from some positive intensity to zero. The high bias voltage also has the important effect of reducing the response time of the liquid crystal in the light valve to changes in the write-in beam intensity, to unexpectedly small values.

The preferred bias voltage is normally associated with one of the higher of the possible bias voltages that produce a minimum intensity transmission to polarized light when measured with a crossed analyzer, in the liquid crystal in the absence of any write-in intensity. In a most preferred form of the invention, the bias voltage is selected to bias the liquid crystal to its maximum voltage that produces a minimum in the curve of the light transmission as a function of voltage of the liquid crystal, but without causing breakdown of the liquid crystal, a voltage known as $V_p$.

The approach of the invention thus provides for a modified structure and operating parameters of the MOS liquid crystal light valve that achieves reduced response time with unimpaired contrast ratio and spatial resolution. Other features and advantages of the invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
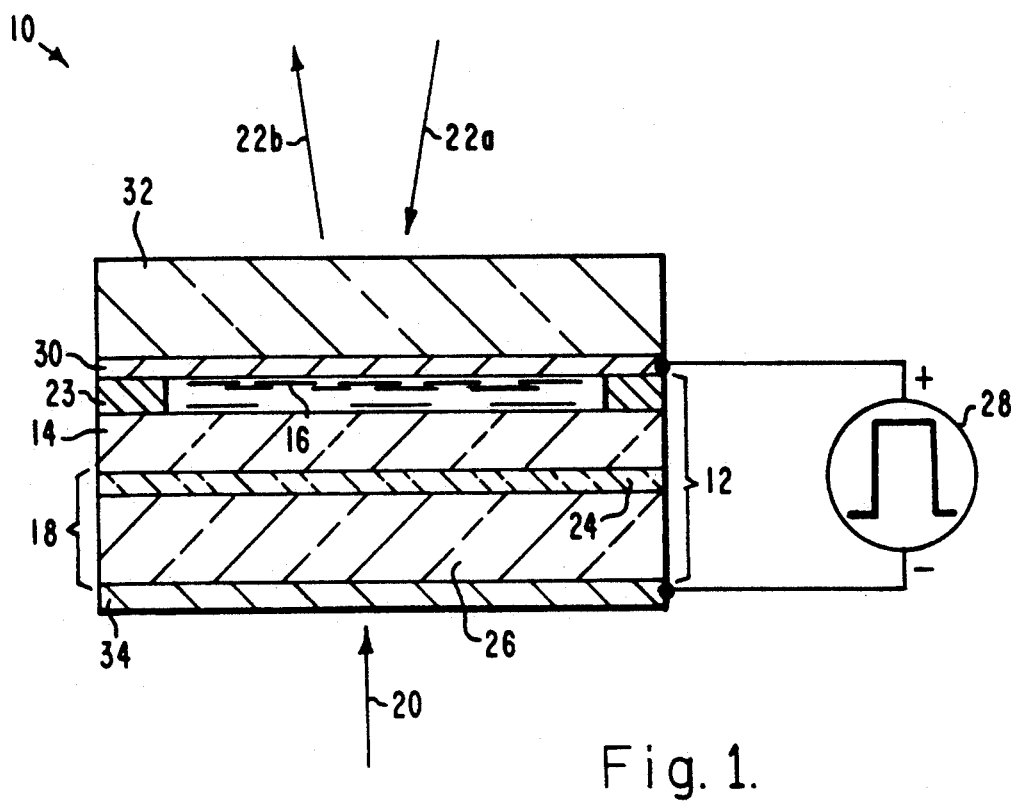
FIG. 1 is a MOS liquid crystal light valve in accordance with the invention.

A MOS liquid crystal light valve 10 is illustrated in FIG. 1. The light valve has an active structure 12, including a dielectric mirror 14, a layer of liquid crystal 16 on one side of the mirror 14, and a MOS light valve substrate 18 on the other side of the mirror 14. A write-in beam 20, also sometimes termed an input beam in the art, is directed against the MOS light valve substrate 18. A projection beam 22, also sometimes termed in output or read-out beam in the art, is directed toward the mirror 14 from the side having the liquid crystal layer 16. The term "light beam" is not limited to visible light, since it also includes invisible radiation such as ultraviolet and infrared energy. As an aid in discussion, the projection beam 22 may be conveniently described as an incident projection beam 22a and a reflected projection beam 22b. The structure and features of such a light valve are disclosed more fully in U.S. Pat. Nos. 4,239,348 and 4,443,064, whose disclosures are incorporated by reference.

The mirror 14 prevents the incident projection beam 22a from photoactivating the MOS photosubstrate 18, and hence interacting with the write-in beam 20. The mirror 14 is preferably a multilayer structure of Si/SiO$_2$, as is well known in the art.

The liquid crystal layer 16 is made of a nematic liquid crystal material such as E7, having a composition that is a mixture of pentyl cyano biphenyl, heptyl cyano biphenyl, heptyloxy cyano biphenyl, and pentyl cyano triphenyl. The liquid crystal material is supplied so that the liquid crystal directors are parallel to the surface of the mirror 14, using any of the well known techniques such as providing a thin layer of SiO on the mirror surface. Spacers 23 define the thickness of the liquid crystal layer 16.

The MOS substrate 18 includes a layer of a dielectric material 24 in contact with the mirror 14, and a layer of a semiconductor material 26 in contact with the dielectric layer 24 on its other side. The dielectric layer 24 is preferably silicon dioxide (SiO$_2$) in a thickness of from about 1500 to about 3000 Angstroms. The semiconductor layer 26 is preferably single crystal, high resistivity silicon in a thickness of about 125 micrometers. The high resistivity silicon layer can be conveniently prepared by slicing wafers of single crystal silicon grown by the floating zone technique.

An external alternating current (AC) voltage, indicated by numeral 28, is applied across the active structure 12. To distribute the voltage across the faces of the liquid crystal layer 16 and the semiconductor layer 26, each is provided with an electrode. A first electrode 30 contacting the liquid crystal layer 16 is transparent and is preferably formed by depositing a 400 Angstrom thick layer of indium-tin-oxide (ITO) transparent conductive material onto a piece of cover glass 32, and then assembling the cover glass to the spacers 23 with the electrode 30 contacting the liquid crystal layer 16. A second electrode 34 is preferably formed by ion implanting a thin conductive layer into the bottom surface of the semiconductor layer 26, as with a P-type dopant such as boron. Alternatively, the second electrode could be another ITO layer.

The liquid crystal is operated in a parallel aligned liquid crystal configuration. The MOS substrate operates with periodic depletion and accumulation phases, produced by the periodic biasing voltage 28. In the depletion (active) phase with a positive value of the biasing voltage, for a P-type silicon photosubstrate, the high-resistivity silicon is depleted completely, and electron/hole pairs generated by the write-in beam 20 are swept by the electric field, thereby producing the signal current that activates the liquid crystal. The voltage is then reversed to a negative refresh phase which prepares the semiconductor for the next cycle of positive voltage. The electric field existing in the depletion region acts to transport the signal charges toward the liquid crystal layer 16 without permitting charge separation, thereby preserving the spatial resolution of the input image. Modifications such as focusing grids can optionally be provided. The operation of the MOS light valve 10 is known, and is described more fully in U.S. Pat. Nos. 4,239,348 and 4,443,064, and in publications such as Efron et al., "The Silicon Liquid-Crystal Light Valve", J. Appl. Physics, Vol. 57(4), pages 1356-1368 (February 1985).

In accordance with a preferred approach of the invention, a liquid crystal light valve comprises an active structure, comprising a layer of a nematic liquid crystal that operates in a surface birefringent mode, mirror means adjacent the liquid crystal layer for reflecting incident light directed against the mirror means through the liquid crystal, and a light valve substrate structure including a dielectric layer adjacent the mirror means and a semiconductor body adjacent the dielectric layer which produces an electric current flow responsive to an incident write-in beam of light; and means for applying an alternating electric potential across the active structure, the electrical potential varying between positive and negative voltages and having an RMS bias voltage that is the highest voltage which produces an intensity minimum in the intensity-voltage curve of the liquid crystal without liquid crystal breakdown, in the absence of a write-in light beam.

Stated alternatively, a liquid crystal light valve comprises an active structure having a layer of a nematic liquid crystal that exhibits a surface birefringent mode when the liquid crystal is biased to its $V_p$, mirror means adjacent the liquid crystal layer for reflecting incident light directed against the mirror means through the liquid crystal, and a light valve substrate structure including a dielectric layer adjacent the mirror means and a semiconductor body adjacent the dielectric layer; and means for applying an alternating electric potential across the active structure, the electrical potential varying between a positive value and a negative value, and having an RMS voltage sufficient to bias the liquid crystal to its $V_p$ when no light is incident upon the light valve substrate structure.

In the most preferred form of the light valve, the liquid crystal layer 16 is made thicker than is conventional for the liquid crystal layer of MOS light valves that operate in the hybrid field effect mode. The prior approach has been to make the liquid crystal layer as thin as possible to achieve a fast response time during switching, as theory predicts that the response time is inversely related to the square of thickness. However, as the thickness of the liquid crystal layer is reduced, the available contrast between light and dark levels ("contrast ratio") is also reduced. Designers of prior MOS liquid crystal light valves therefore would design to an optimum small liquid crystal thickness, typically about 2-4 micrometers, depending upon the specific application.

It is known that a liquid crystal layer can be operated in a surface birefringent mode for improved response time of test cells. See Wu and Wu, "High Speed Liquid-Crystal Modulators Using Transient Nematic Effect," J. Appl. Physics, vol. 65, no. 2, pages 527-532 (January 1989). In this mode, only that portion of the liquid crystal near the surface of the layer actively responds to applied voltage changes, while the portion in the center of the layer remains essentially static and nonresponsive to the voltage changes.

In the present invention, the liquid crystal layer 16 is operated in this surface birefringent mode. To achieve this mode together with a good contrast ratio under crossed polarizer and analyzer, the layer 16 must be sufficiently thick, typically at least about 8 micrometers and preferably about 10 micrometers in thickness. The preferred thickness range of the liquid crystal is from 8 to about 12 micrometers in thickness. When the thickness is less than about 8 micrometers, it is not possible to develop an acceptably good contrast ratio concurrently with a fast response time to changes in the write-in light intensity. When the thickness is more than about 12 micrometers, the response time decreases slowly with increasing thickness, and the sensitivity to the write-in beam tends to decrease. These values may vary somewhat depending upon the type of liquid crystal, the wavelengths of the light, and other parameters. The thickness at which satisfactory operation occurs for particular requirements is determined in a manner to be described subsequently.

Figure 2:
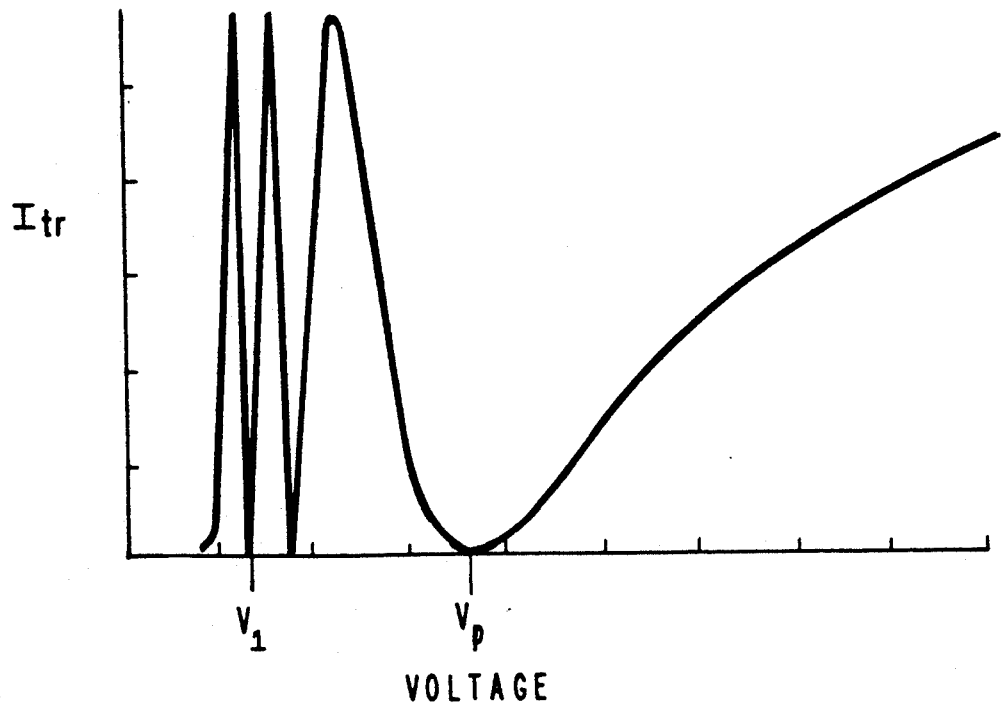
FIG. 2 is a graph of the measured reflective mode transmission of a liquid crystal layer as a function of applied voltage across the layer.

FIG. 2 illustrates the graph of transmitted light intensity $I_{tr}$ of a liquid crystal layer in the surface birefringent mode as a function of the RMS (root mean square) of the biasing voltage V applied across the layer. There is a cyclic pattern of intensity variation as a function of RMS biasing voltage, with a succession of minima in intensity I with increasing voltages $V_1, V_2, \ldots, V_{p-1}, V_p$. As the voltage is increased, above a maximum voltage $V_p$ there are no further minima in intensity I, but at some point the structure is degraded by liquid crystal breakdown.

When the light valve 10 is operated, the effective voltage applied to the liquid crystal layer 16 is the applied periodic electrical biasing voltage plus the induced voltage due to the electron/hole pairs generated in the substrate 18 responsive to the write-in beam 20. The periodic voltage varies between the positive (i.e., causing electrons in the structure 18 to move toward the liquid crystal layer 16) bias voltage and a negative voltage, this periodic signal having an RMS value discussed previously. When the write-in beam intensity is zero, the transmitted intensity of the liquid crystal of the light valve, which determines the intensity of the projected beam, measured using polarized projection light with the reflected beam passing through a crossed analyzer, should also be as close to zero as possible to achieve a good contrast ratio. The biasing voltage is therefore selected from the group of voltages $V_1, V_2, \ldots, V_{p-1}, V_p$ that produce a minimum transmitted intensity $I_{tr}$.

Figure 3:
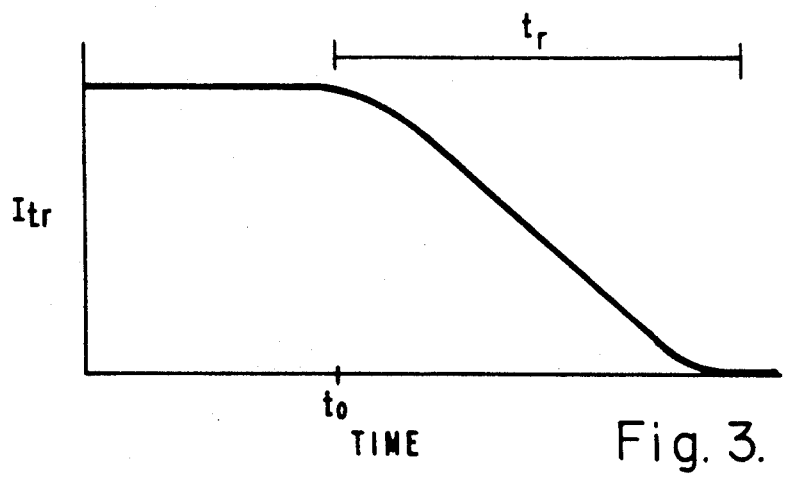
FIG. 3 is a graph of projected beam light intensity as a function of time for a thin liquid crystal operating in the normal birefringent mode in a liquid crystal light valve.
Figure 4:
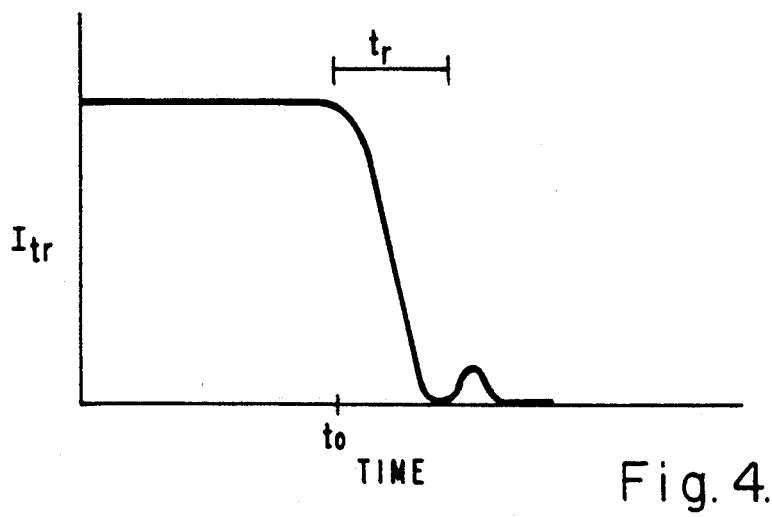
FIG. 4 is a graph of projected beam light intensity as a function of time for a thick liquid crystal operating in the surface birefringent mode in a liquid crystal light valve.

The inventors have observed that the response time of the light valve varies significantly according to the level of the biasing voltage selected. FIGS. 3 and 4 illustrate the change in intensity $I_{tr}$ of the reflected projection light beam 22b when the liquid crystal is biased with a RMS voltage $V_p$ and the write-in light beam 20 is suddenly reduced from a constant intensity to zero intensity at time $t_o$. This event corresponds to a sudden reduction in voltage from the sum of the bias voltage and the voltage induced by the write-in beam to the bias voltage alone in FIG. 2. FIG. 2 shows that the transmitted intensity of the projection beam is expected to be reduced as a result, and FIGS. 3 and 4 depict how fast that relaxation occurs.

FIG. 3 depicts results for a thin liquid crystal, in the 2-4 micrometer range, operating in the normal birefringent mode, while FIG. 4 depicts results for a thick liquid crystal, in the 8-12 micrometer range, operating in the surface birefringent mode. The important difference for the two thicknesses of liquid crystals is that the value of $V_p$ for a thin liquid crystal is less than that for a thick liquid crystal in the light valve.

For the thinner liquid crystal with the lower $V_p$ of FIG. 3, the response time $t_r$ is typically more than about 10 milliseconds. This response time is unacceptably long for some applications of MOS liquid crystal light valves and for most optical information processing operations.

For the thicker liquid crystal with the larger $V_p$ of FIG. 4, two important features are observed. First, there is an undershoot 36 or "bounce" effect in the intensity as a function of time, wherein the intensity decreases rapidly to a minimum value, increases again briefly, and settles to the steady state minimum value. Second, the response time $t_r$ is significantly reduced as compared with that of the situation of FIG. 3, to the order of about 1 millisecond. This reduced response time permits acceptable operation of many light-valve based devices for which longer response times are unacceptable, such as, for example, an optical information processor.

In the most preferred embodiment of the invention, the liquid crystal layer of a MOS semiconductor light valve is made sufficiently thick to achieve the enhanced surface birefringent mode operation as illustrated in FIG. 4. This thickness is at least about 8 micrometers for devices tested to date, and is most preferably about 10 micrometers. The RMS applied biasing voltage is selected as the maximum voltage $V_p$ at which an intensity minimum in the curve of $I_{tr}$ versus voltage (FIG. 2) occurs.

A generally applicable numerical value of $V_p$ cannot be stated, because it depends upon the type of liquid crystal, the wavelength of the projection light, and other factors. Nevertheless, the procedure for selecting the combination of structural parameters and biasing voltage can be set forth with certainty:

Construct a nematic liquid crystal/MOS light valve of the configuration to be used in practice. Perform a controlled series of calibration tests of the type discussed in relation to FIGS. 3 and 4, with the liquid crystal operating in the surface birefringent mode, to determine the projected beam response time as a function of applied biasing voltage $V_p$ for a range of thicknesses of the liquid crystal. For a particular application, identify a $V_p^*$ corresponding to the required response time, from this calibration relation. Select a liquid crystal of sufficient thickness, typically about 8-12 micrometers, that its $V_p$ is equal to or greater than $V_p^*$.

It is possible that other biasing voltages in the series $V_1, V_2, \ldots$ up to but not including $V_p$ will give acceptably reduced response times as well. Such acceptable biasing voltages can be determined with the preceding procedure. However, in studies conducted to date, the response time corresponding to $V_p$ has been observed to be much shorter than the response time corresponding to lower biasing voltages of the series. For example, in one series of tests, the response time for $V_p$ was 1 millisecond, the response time for $V_{p-1}$ was 13 milliseconds, and the response time for $V_{p-2}$ was 19 milliseconds. For this particular situation and application, only the biasing voltage $V_p$ could be considered a viable candidate.

Thus, in accordance with the invention, a process for furnishing and operating a liquid crystal light valve having a response time to variations in a write-in light beam less than a preselected value comprises the steps of providing an active structure having a layer of a nematic liquid crystal that exhibits a surface birefringent mode when the liquid crystal is biased to its $V_p$, the layer of liquid crystal being selected such that its $V_p$ is no less than $V_p^*$, a voltage corresponding to the preselected response time, a mirror adjacent the liquid crystal layer for reflecting a projected light beam directed against the mirror means through the liquid crystal, and a light valve substrate structure including a dielectric layer adjacent the mirror means and a semiconductor body adjacent the dielectric layer; and applying an alternating electric potential across the active structure, the electrical potential varying between a positive value and a negative value, and having an RMS voltage sufficient to bias the liquid crystal to its $V_p$ when no light is incident upon the light valve substrate structure.

A MOS liquid crystal light valve constructed in the manner indicated has an unexpectedly short response time as compared with that previously predicted in the art of MOS liquid crystal light valves, where it was thought that reduced liquid crystal thickness led to reduced response time. See for example the publication of Efron et al. cited previously, J. Appl. Phys. vol. 57(4) at page 1363.

Figure 5:
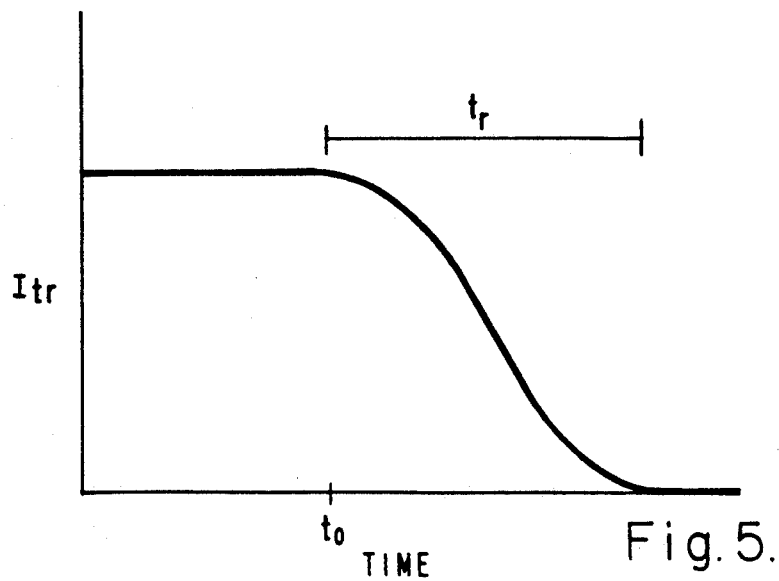
FIG. 5 is a graph of transmitted beam intensity of a test cell having a liquid crystal of the same thickness as that of the liquid crystal light valve of FIG. 4.

The short response times of the light-activated MOS liquid crystal light valve is also not expected from the prior work on test cells using the liquid crystal in the surface birefringent mode but not activated by light. FIG. 5 presents a graph of the light intensity as a function of time for a test cell operating with the same thickness of liquid crystal as the light valve of FIG. 4. The test cell was formed as two pieces of glass, with facing conductive transparent coatings, and a thickness of the liquid crystal between the glass pieces. This test cell whose operation is depicted in FIG. 5 is not light activated, while the light valve of FIG. 4 is light activated. The response time $t_r$ of the test cell of FIG. 5 is about 5 milliseconds, roughly five times the response time of the light-activated light valve of FIG. 4. The response time of the light valve is unexpectedly short as compared with the response time of the test cell.

The MOS liquid crystal light valve of the invention achieves unexpectedly reduced response times as well as good spatial resolution and contrast ratio. To illustrate these features, a MOS liquid crystal light valve like that of FIG. 1 was constructed. The liquid crystal layer was 10 micrometers thick of the commercial nematic liquid crystal E7. The biasing voltage applied across the active structure was an asymmetric pulse having a maximum voltage of +30 volts for 115 microseconds and a minimum voltage of −13 volts for 85 milliseconds, applied at a frequency of 5 Kilohertz. The write-in light was a beam of red light having a peak wavelength of 660 nanometers produced by a light-emitting diode. In a series of experiments, the projection beam was varied to 485, 600, and 666 nanometers wavelength. The response times were measured to be 1.0, 3.0, and 6.4 milliseconds, respectively. In order to maintain these response times, the bias voltage had to be changed to remain at the RMS value of $V_p$, since $V_p$ is dependent upon wavelength. The $V_p$ voltages, determined as described previously, were about 5.3 volts for 485 nanometers, 4.4 volts for 600 nanometers, and 3.8 volts for 666 nanometers. When operated in this way, the limiting spatial resolution of the light valve was 30 line pairs per millimeter, and the contrast ratio was 23:1 for a 485 nanometer projection beam.

Although particular embodiments of the invention have been described in detail for purposes of illustration, various modifications may be made without departing from the spirit and scope of the invention. Accordingly, the invention is not to be limited except as by the appended claims.

What is claimed is:

1. A liquid crystal light valve, comprising:
   an active structure having:
     a layer of a nematic liquid crystal that is operable in a surface birefringent mode when the liquid crystal is biased to a voltage $V_p$ which produces a minimum transmittance of the liquid crystal layer,
     mirror means adjacent the liquid crystal layer for reflecting incident light directed against the mirror means through the liquid crystal, and
     an MOS light valve substrate structure on the opposite side of the mirror means from the layer of liquid crystal; and
   means for applying an alternating electric potential across the active structure, the electrical potential varying between a positive value and a negative value, and having an RMS voltage sufficient to bias the liquid crystal to its $V_p$ when no light is incident upon the light valve substrate structure,
   wherein the layer of liquid crystal is at least about 8 micrometers in thickness.

2. The light valve of claim 1, wherein the layer of liquid crystal is no more than about 12 micrometers in thickness.

3. A liquid crystal light valve, comprising;
   an active structure having;
     a layer of a nematic liquid crystal that is operable in a surface birefringent mode when the liquid crystal is biased to a voltage $V_p$ which produces a minimum transmittance of the liquid crystal layer,
     mirror means adjacent the liquid crystal layer for reflecting incident light directed against the mirror means through the liquid crystal, and
     an MOS light valve substrate structure on the opposite side of the mirror means from the layer of liquid crystal; and
   means for applying an alternating electric potential across the active structure, the electrical potential varying between a positive value and a negative value, and having an RMS voltage sufficient to bias the liquid crystal to its $V_p$ when no light is incident upon the light valve substrate structure,
   wherein the liquid crystal is sufficiently thick that the value of $V_p$ for the layer of liquid crystal is no less than $V_p^*$, a preselected voltage corresponding to a required response time.

4. The light valve of claim 3, wherein the MOS light valve substrate structure is reactive to a write-in light beam, the substrate structure includes a dielectric layer adjacent the mirror means and a semiconductor body adjacent the dielectric layer and the dielectric layer is silicon dioxide, and the semiconductor layer is silicon.

5. A liquid crystal light valve, comprising:
   an active structure, comprising
     a layer of a nematic liquid crystal that is operable in a surface birefringent mode of operation,
     mirror means adjacent the liquid crystal layer for reflecting incident light directed against the mirror means through the liquid crystal, and
     a light valve substrate structure which is reactive to a write-in beam, the substrate structure including a dielectric layer adjacent the mirror means and a semiconductor body adjacent the dielectric layer; and
   means for applying an electric bias potential varying between a positive and a negative value across the active structure, the RMS potential producing a minimum in the transmittance of the liquid crystal to polarized light that is analyzed with a crossed analyzer, when there is no write-in light beam,
   the combination of thickness of the liquid crystal and the applied bias potential being such that upon discontinuance of the write-in light beam the transmittance as a function of an induced liquid crystal voltage exhibits an undershoot prior to approaching a steady state as a function of time.

6. The light valve of claim 5, wherein the layer of liquid crystal is at least about 8 micrometers in thickness.

7. The light valve of claim 5, wherein the layer of liquid crystal is from about 8 to about 12 micrometers in thickness.

8. The light valve of claim 5, wherein the dielectric layer is silicon dioxide, and the semiconductor layer is silicon.

9. The light valve of claim 5, wherein the applied bias voltage is the greatest voltage that produces a minimum in the transmittance of the liquid crystal for the selected liquid crystal layer.

10. A liquid crystal light valve, comprising:
    an active structure, comprising
      a layer of a nematic liquid crystal that operates in a surface birefringent mode,
      mirror means adjacent the liquid crystal layer for reflecting incident light directed against the mirror means through the liquid crystal, and
      a light valve substrate structure including a dielectric layer adjacent the mirror means and a semiconductor body adjacent the dielectric layer which produces an electric current flow responsive to an incident write-in beam of light; and means for applying an alternating electric potential across the active structure, the electrical potential varying between positive and negative voltages and having an RMS bias voltage that is the highest voltage which produces an intensity minimum in read-out light transmitted in the read-out light transmittance intensity-voltage curve of the liquid crystal without liquid crystal breakdown, in the absence of a write-in light beam.

11. A process for furnishing and operating a liquid crystal light valve, comprising the steps of:
providing an active structure having;
a layer of a nematic liquid crystal that is operable in a surface birefringent mode when the liquid crystal is biased to voltage $V_p$ which produces a minimum transmittance of the liquid crystal layer,
a mirror adjacent the liquid crystal layer for reflecting a projected light beam directed against the mirror through the liquid crystal, and
a light valve substrate structure including a dielectric layer adjacent the mirror and a semiconductor body adjacent the dielectric layer; and
applying an alternating electric potential across the active structure, the electrical potential varying between a positive value and a negative value, and having an RMS voltage sufficient to bias the liquid crystal to its $V_p$ when no light is incident upon the light valve substrate structure, and
wherein the layer of liquid crystal is at least about 8 micrometers in thickness.

12. The process of claim 11, wherein the layer of liquid crystal is no more than about 12 micrometers in thickness.

13. A process for furnishing and operating a liquid crystal light valve, comprising the steps of;
providing an active structure having;
a layer of a nematic liquid crystal that is operable in a surface birefringent mode when the liquid crystal is biased to a voltage $V_p$ which produces a minimum transmittance of the liquid crystal layer,
a mirror adjacent the liquid crystal layer for reflecting a projected light beam directed against the mirror through the liquid crystal, and
a light valve substrate structure including a dielectric layer adjacent the mirror and a semiconductor body adjacent the dielectric layer; and
applying an alternating electric potential across the active structure, the electrical potential varying between a positive value and a negative value, and having an RMS voltage sufficient to bias the liquid crystal to its $V_p$ when no light is incident upon the light valve substrate structure, and
wherein the thickness of the layer of liquid crystal is selected such that its $V_p$ is no less than $V_p^*$, a voltage corresponding to a preselected response time.

14. The process of claim 13 further including the additional step of directing a write-in light beam against the substrate structure.

15. A process for controlling a projection light beam, comprising the steps of:
providing a liquid crystal light valve with an active structure comprising
a layer of a nematic liquid crystal that is operable in a surface birefringent mode of operation,
mirror means adjacent the liquid crystal layer for reflecting incident light directed against the mirror means through the liquid crystal, and
a light valve substrate structure which is reactive to a write-in beam, the substrate structure including a dielectric layer adjacent the mirror means and a semiconductor body adjacent the dielectric layer;
applying across the active structure an electric bias potential varying between a positive and a negative value across the active structure, the RMS potential producing a minimum in the transmittance of the liquid crystal to polarized light that is analyzed with a crossed analyzer, when there is no write-in light beam,
the combination of thickness of the liquid crystal and the applied bias potential being such that upon discontinuance of the write-in light beam the transmittance as a function of an induced liquid crystal voltage exhibits an undershoot prior to approaching a steady state as a function of time; and
directing a projection beam against the liquid crystal side of the active structure, while varying the write-in beam.

16. The process of claim 15, wherein the RMS potential of the bias voltage is at a voltage $V_p$ which produces the minimum transmittance of the liquid crystal layer.

17. The process of claim 15, wherein the thickness of the liquid crystal is from about 8 to about 12 micrometers.

* * * * *